United States Patent [19]

Stranski et al.

[11] Patent Number: 5,542,151
[45] Date of Patent: Aug. 6, 1996

[54] ROTATABLE BENDING JOINT FOR COLLAPSIBLE PLAYPEN

[75] Inventors: Sandra K. Stranski; Daniel P. Sumser, both of North Canton; Mark A. Sedlack, Cuyahoga Falls, all of Ohio

[73] Assignee: Century Products Company, Macedonia, Ohio

[21] Appl. No.: 432,256

[22] Filed: May 1, 1995

[51] Int. Cl.⁶ .............................. A47D 7/00; E05D 11/10
[52] U.S. Cl. ................... 16/326; 16/329; 5/99.1; 403/97
[58] Field of Search .............................. 16/324–326, 329; 403/97, 102; 5/99.1

[56] References Cited

U.S. PATENT DOCUMENTS

| | | | |
|---|---|---|---|
| 4,929,113 | 5/1990 | Sheu | 16/329 |
| 5,039,118 | 8/1991 | Huang | 403/97 |
| 5,056,805 | 10/1991 | Wang | 403/93 |
| 5,062,179 | 11/1991 | Huang | 403/93 |
| 5,123,768 | 6/1992 | Franklin | 403/97 |
| 5,377,368 | 1/1995 | Cheng | 16/329 |
| 5,381,570 | 1/1995 | Cheng | 16/329 |

*Primary Examiner*—M. Rachuba
*Assistant Examiner*—Donald M. Gurley
*Attorney, Agent, or Firm*—Graham & James LLP

[57] ABSTRACT

An improved rotatable joint of the kind disclosed in U.S. Pat. No. 5,381,570 for foldable tubular playpen frames having a step in the tooth of a recessed sprocket portion in which a connecting gear rests. In order to unlock the joint one must move the gear axially inwardly with a pushbutton as well as relieve the stresses on the joint by lifting up the tubular bars connected to the joint so that the gear may slip off the step. In this way an additional factor of safety is built-in in order to unlock the joint, and accidental release is reduced.

8 Claims, 2 Drawing Sheets

ROTATABLE BENDING JOINT FOR COLLAPSIBLE PLAYPEN

BACKGROUND OF THE INVENTION

This invention relates to an improved upper play yard or playpen frame hinge or joint of the kind disclosed in U.S. Pat. No. 5,381,570 (Cheng), incorporated by reference herein in its entirety.

SUMMARY OF THE INVENTION

The present invention is intended to provide an improved hinge for a folding playpen frame.

The improved playpen has the novel feature of employing an upper frame hinge that requires two steps to unlock, as opposed to the single step in the Cheng patent. The frame hinge is composed of two halves, a gear received in one half, and a mating gear receiving face with teeth having a "step" inset in the other half. When the hinge is locked open, due to the nature of the stresses and forces within the hinge and frame supporting the hinge, the gear receiving face supports at this "step" inset the gear, which prevents rotation of the gear with respect to its half of the hinge holding it. To unlock the hinge and allow the frame to fold, the user must perform two steps, in contrast to the one step in the Cheng patent: first the user must push a button in opposition to a coil spring that releases the gear from the gear receiving face, as in the Cheng patent, but in addition the user must lift up on the upper frame arms that are attached to the hinge to allow the stress due to gravity and other compressive and tensile stresses to be relieved and allow the gear to slip off the "step" inset and allow relative rotation between the gear and hinge, to allow the two halves of the hinge to rotate with respect to one another.

The present invention thus allows an additional factor of safety over and above the hinge design disclosed in U.S. Pat. No. 5,381,570.

DETAILED DESCRIPTION OF THE PREFERRED EMBODIMENTS

Figure 1A:
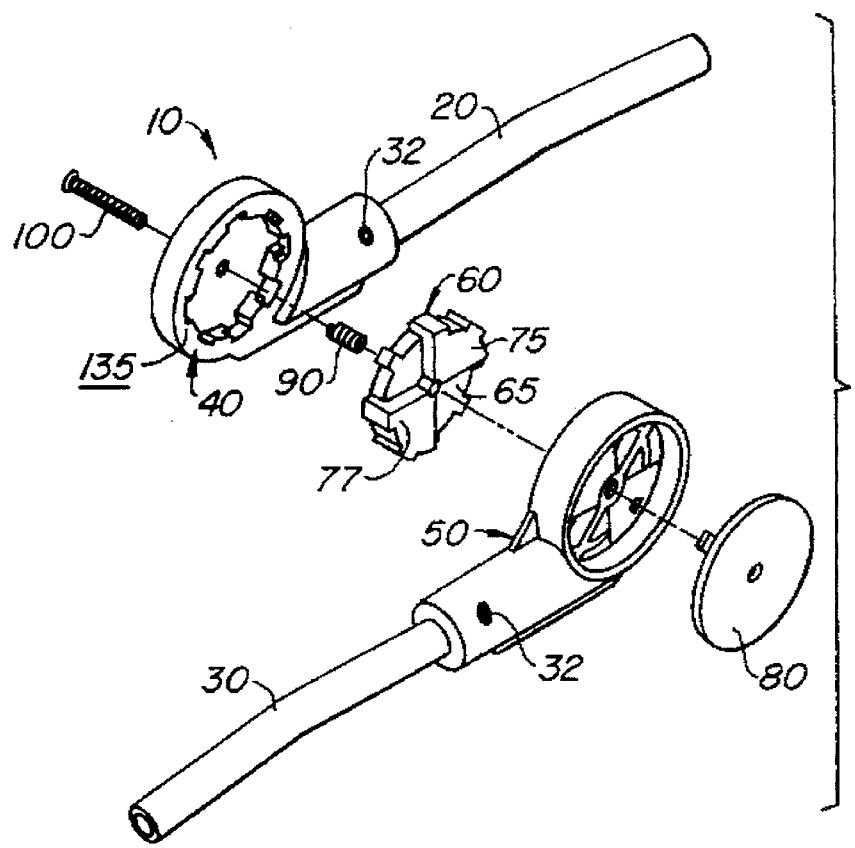
FIG. 1A shows an isometric exploded view of the hinge of the present invention.
Figure 1B:
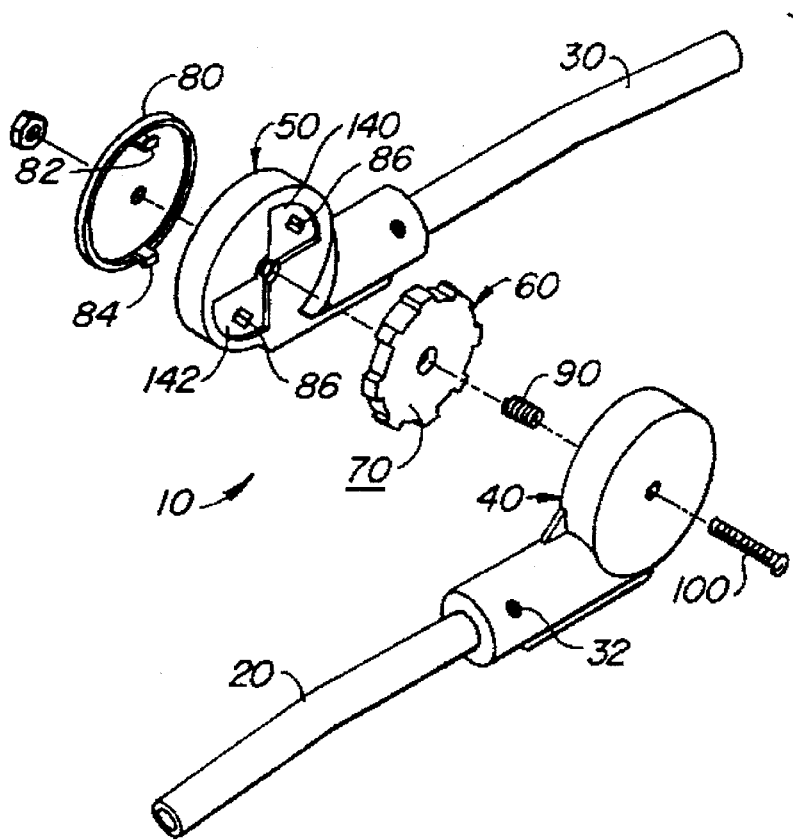
FIG. 1B is a mirror image of FIG. 1A, viewed from behind.

Referring to the figures, there is shown in FIGS. 1A and 1B a joint or hinge 10 for receiving and joining two frame bar members 20 and 30 at its hollow ends, which may have apertures 32 to allow one to fasten the ends to the bars. The hinge 10 and frame members 20, 30 are configured in a relation similar to the upper frame 2 and hinge 3 shown in Cheng, U.S. Pat. No. 5,381,570, upon which the present design is an improvement on, in that the hinge forms part of a collapsible baby playpen.

Hinge 10 is formed of two halves, a gear receiving face half 40 and a gear holding face half 50. Gear holding face half 50 holds a gear 60, which has a first indented side 65 and a second smooth side 70. The indented side 65 has a pair of butterfly shaped detents or protrusions, 75, 77, which are received by the recessed side of the gear holding face half 50. A push-button 80 with two prongs 82, 84 fit through apertures 86 in gear holding face half 50 to push gear 60 in opposition to a coil spring 90, which is interposed between gear 60 and the recessed sprocketed face 130 of gear receiving face halve 40. A nut and bolt arrangement 100 secures and centers the different parts through a central aperture, but allows axial movement of the parts.

Figure 2:
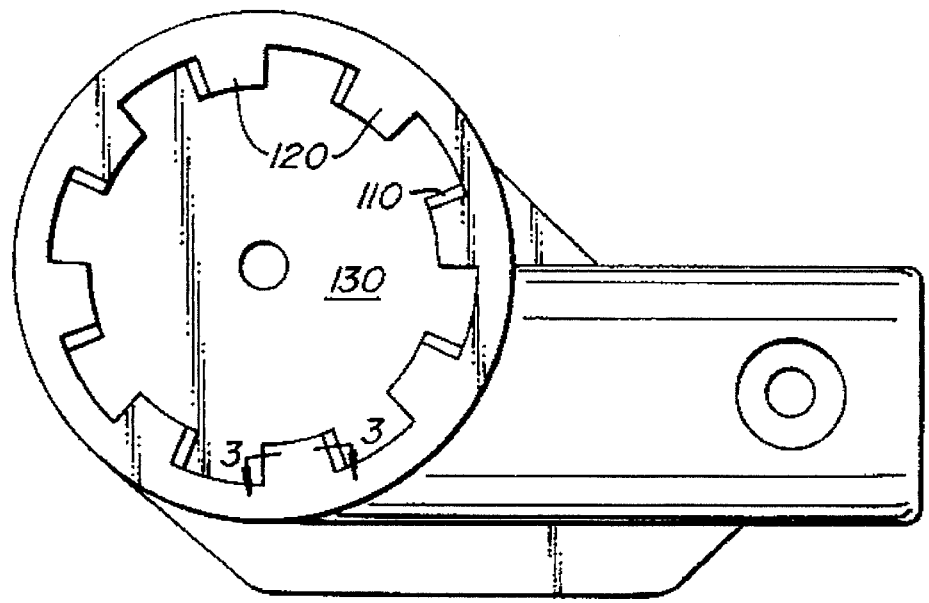
FIG. 2 shows a top view of the gear receiving face half of the hinge.
Figure 3:
FIG. 3 shows a cut-away portion of FIG. 2.
Figure 4:
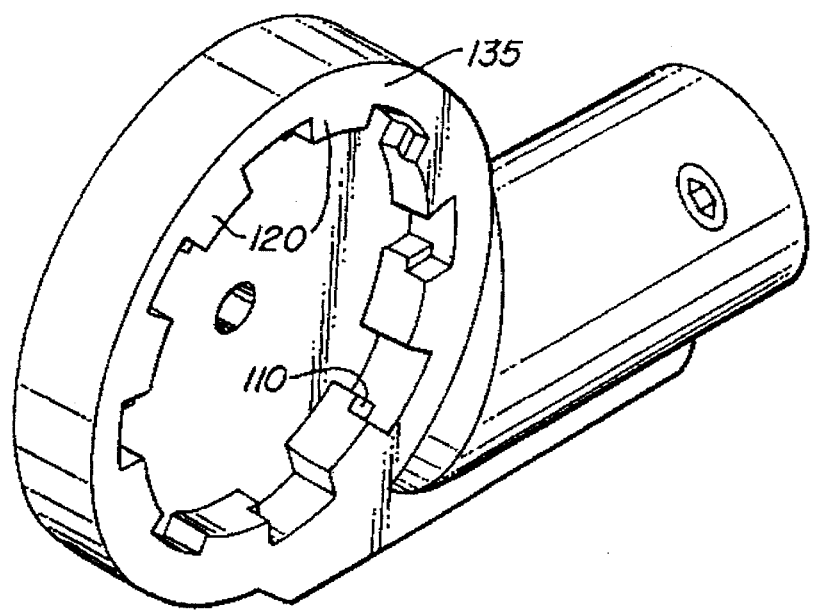
FIG. 4 shows a perspective view of FIG. 2.

One important difference between the joint of present invention and the joint disclosed in the Cheng patent is the presence of a "step" or ledge 110 inset or seat on a side of each of the recessed sprocket teeth 120, which point radially inwardly to the center of the recessed sprocketed face 130 of the gear receiving face half 40 of joint 10. The ledge 110 can be seen at the left side of the teeth 120, when viewed as from FIGS. 2 and 4. Step 110 is a ledge spaced 5 mm up from the base of the 13 mm length of the recessed sprocket teeth 120, as shown in FIG. 3 (the 13 mm length of the teeth corresponding to the approximate width of the gear 60), and is about 0.5–1 mm wide circumferentially along the recessed sprocket tooth, although the dimensions are not too critical. Gear 60 is about 13 mm in width. The gear 60 rests on the ledge 110, and when the joint 10 is not locked, the gear 60 fits, if depressed in opposition to coil spring 90, substantially entirely flush within the recessed sprocketed face 130 of gear receiving face 40 and does not have its butterfly protrusions 75, 77 protrude out (except for a tiny hub portion about the aperture that receives bolt 100, and which is received by a mating recess in gear receiving face 40). As shown, the teeth forming the gear are disposed to fit in the space between the sprocket teeth 120. The ledge 110 on the recessed sprocket teeth 120 thus allows, when the gear 60 rests on the ledge 110, for the butterfly detents 75, 77 of the gear 60 to stick out from the width of gear receiving face 40 (from side 135) and engage the corresponding indents 140, 142 of gear holding face half 50. Joint 10 has an outer circular diameter of about 55 mm.

Operation of like components in joint 10 is generally the same as like components as described in the Cheng patent, incorporated herein by its entirety, however, in the present invention, due to the presence of the step 110 in the teeth 120 of gear receiving face half 40, there is provided an additional factor of safety when collapsing (folding) the joint.

In the present invention, the presence of the step 110 is such that it will just support the gear 60 so that its detents 75, 77 will extend out from side 135 of gear receiving face half 40 and thus engage the corresponding butterfly indents 140, 142 of gear holding face half 50. In addition, the presence of compression coil spring 90 will bias gear 60 away from recessed sprocketed face 130 of gear receiving face halve 40.

In the Cheng patent joint one danger that exists is the accidental folding of the joint and possible entrapment of an infant's limb if the push button (push cap 36 in Cheng) is accidentally depressed. In the present invention, this danger is mitigated due to the unique function of the step 110 described above, which requires an additional motion to fold the joint, namely, a lifting up and relieving of the stresses in the joint. Thus, when a user desires to collapse (fold) the upper frame of a playpen, the button 80 is depressed, which should depress, via the two prongs 82, 84 acting on gear 60, the gear 60 and its protrusions 75, 77, to withdraw inside the recessed sprocketed face 130 of gear receiving face halve 40, against the bias of spring 90, and thus disengage the gear detents 75, 77 from the corresponding intents 140, 142 of gear holding face half 50.

In the present invention, however, unlike the Cheng patent, the presence of ledge 110 which the gear ordinarily rests on provides just enough resistance to the axial movement of the gear when the pushbutton is depressed to prevent such a retraction of the gear 60 inside face 130. It has been found in practice that only by relieving the stresses accumulated on the joint 10, by lifting up the joint (as by lifting up the frame bars 20, 30) is it sufficient to unhitch the gear 60 from engagement with the ledge 110, and thus allow the force from the push-button to retract the gear 60 to inside the face 130 of gear receiving face halve 40, as explained above. Once this occurs, the joint may be rotated and the playpen frame bars collapsed.

In this way the present invention provides an additional factor of safety: in order to unlock the joint for rotation a user must not only depress the pushbutton associated with the joint, but also lift up and relieve the accumulated stresses on the joint by lifting the frame members attached to the joint. As it is unlikely an infant will have the strength to do this, accidental collapsing of the playpen frame is reduced.

The joint of the present invention may be constructed from a high-impact engineering thermoplastic material that can be injection molded or molded.

As disclosed in the Cheng patent, the joint of the present invention may be used in a collapsible playpen, especially to join the horizontal upper tubular bar members.

The foregoing description is offered for illustrative purposes only. Numerous modifications and variations may be readily apparent to those skilled in the art, while still falling within the spirit and scope of the invention as claimed herein below.

What is claimed is:

1. A rotatable hinge comprising:

a first circular portion having a recessed portion forming a recessed sprocket portion with sprocket teeth pointing radially inwardly;

a gear having a plurality of gear teeth on its periphery, said recessed portion sufficiently deep to substantially receive said gear, said gear received by said recessed sprocket portion, and said gear teeth interspaced with said sprocket teeth, said gear having on one side a protrusion;

a second circular portion having a recess, said recess receiving said gear protrusion;

said gear interposed between said first and second circular portions and preventing relative movement between said first and second circular portions when said protrusion is received by said recess;

wherein said sprocket teeth have on one side thereof a ledge portion extending radially upon which said gear rests;

wherein to allow said first and second circular portions of said hinge to rotate with respect to one another and unlock said ring, said gear is displaced from said ledge portion and displaced axially within said recessed sprocket portion, to allow said gear protrusion to disengage from said recess of said second circular portion.

2. The rotatable hinge according to claim 1, further comprising a spring disposed between said recessed sprocket portion and said gear, said spring axially disposed in the center of said gear and recessed sprocket portion.

3. The rotatable hinge according to claim 2, wherein said recess of said second circular portion has an aperture, a pushbutton having a protrusion extending through said aperture, said pushbutton protrusion engaging said gear to displace said gear axially into said recessed sprocket portion when said gear is displaced from said ledge portion.

4. The rotatable hinge according to claim 3, wherein said first and second circular portions are connected to tubular bars in a horizontal manner to form a cross-bar frame for a child's playpen, and said gear is displaced from said ledge portion by lifting up said bars to relieve the stress on said hinge.

5. The rotatable hinge according to claim 4, further comprising an aperture in said gear and said first and second circular portions, said aperture receiving a nut and bolt.

6. A rotatable bending joint for bar members comprising:

a first portion receiving a bar at one end and having a recessed sprocketed portion, said sprocketed portion having a plurality of teeth surrounding and forming said recessed portion and pointing radially inwardly, said teeth having along one side thereof a step portion;

a second portion receiving a tubular bar at one end and having a plurality of indents, said indents having at least one aperture passing therethrough and a protrusion connected to a push-button passing through said apertures, said indents facing said recessed sprocketed portion;

a gear having on one side a plurality of detents sized to mate with said indents and of sufficient width to be received substantially flush inside said recessed sprocketed portion;

a spring interposed between said gear and said recessed sprocketed portion and biasing said gear away from the sprocketed portion;

said gear allowing said first and second portions of said joint to be rotatably and fixably secured with respect to one another when said detents are mated with said indents and when said gear is resting on said step portion;

whereas to allow said first and second portions of said joint to rotate with respect to one another and unlock said joint, said push-button is depressed and the ends of the first and second portions are lifted up to allow said gear to alight from said step portion and allowing said push-button to push said gear further into said recessed sprocketed portion of said first portion to allow said indents to detach from engagement with said detents.

7. The rotatable bending joint according to claim 6, wherein:

said recessed sprocketed portion is about 13 mm deep, said gear is about 13 mm wide, and said step portion is about 5 mm high from the bottom of said recessed portion and up to about 1 mm wide radially.

8. In combination, in a playpen made from tubular bars supported by a rotatable bending joint, the invention comprising:

a playpen having a plurality of tubular bars supported therebetween by a rotatable bending joint;

said joint having a first portion receiving one of said plurality bar at one end and having a recessed sprocketed portion, said sprocketed portion having a plurality of teeth surrounding and forming said recessed portion and pointing radially inwardly, said teeth having along one side thereof a step portion;

a second portion receiving another of said tubular bars at one end and having a plurality of indents, said indents having at least one aperture passing therethrough and a protrusion connected to a push-button passing through said apertures, said indents facing said recessed sprocketed portion;

a gear having on one side a plurality of detents sized to mate with said indents and of sufficient width to be received substantially flush inside said recessed sprocketed portion;

a spring interposed between said gear and said recessed sprocketed portion and biasing said gear away from the sprocketed portion;

said gear allowing said first and second portions of said joint to be rotatably and fixably secured with respect to one another when said detents are mated with said indents and when said gear is resting on said step portion;

whereas to allow said first and second portions of said joint to rotate with respect to one another and unlock said joint, said push-button is depressed and said tubular bars and said ends of the first and second portions are lifted up to allow said gear to alight from said step portion and allowing said push-button to push said gear further into said recessed sprocketed portion of said first portion to allow said indents to detach from engagement with said detents.

* * * * *